(12) United States Patent
Kaji et al.

(10) Patent No.: US 10,838,161 B2
(45) Date of Patent: Nov. 17, 2020

(54) OPTICAL FIBER CABLE

(71) Applicant: FUJIKURA LTD., Tokyo (JP)

(72) Inventors: Tomoaki Kaji, Sakura (JP); Kouji Tomikawa, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/481,768

(22) PCT Filed: Feb. 6, 2018

(86) PCT No.: PCT/JP2018/003976
§ 371 (c)(1),
(2) Date: Jul. 29, 2019

(87) PCT Pub. No.: WO2018/150947
PCT Pub. Date: Aug. 23, 2018

(65) Prior Publication Data
US 2019/0391353 A1 Dec. 26, 2019

(30) Foreign Application Priority Data

Feb. 20, 2017 (JP) ................. 2017-029056

(51) Int. Cl.
G02B 6/44 (2006.01)
(52) U.S. Cl.
CPC ................. G02B 6/4433 (2013.01)
(58) Field of Classification Search
CPC .................................. G02B 6/4433
USPC ........................................ 385/100
See application file for complete search history.

(56) References Cited

U.S. PATENT DOCUMENTS

| 2004/0258375 | A1 | 12/2004 | Honjo et al. |
| 2011/0311191 | A1 | 12/2011 | Hayashishita et al. |
| 2014/0321822 | A1 | 10/2014 | Yasuda et al. |
| 2015/0328253 | A1 | 11/2015 | Michaud et al. |
| 2015/0370026 | A1* | 12/2015 | Hudson, II ........... G02B 6/4429 385/113 |

FOREIGN PATENT DOCUMENTS

| JP | H04-177304 A | 6/1992 |
| JP | H11-203955 A | 7/1999 |
| JP | 2001-194567 A | 7/2001 |

(Continued)

OTHER PUBLICATIONS

Telcordia Technologies, Inc., "Generic Requirements for Optical Fiber and Optical Fiber Cable"; Telcordia Technologies Generic Requirements GR-20-CORE, Issue 4; Jul. 2013 (184 pages).

(Continued)

Primary Examiner — Jerry M Blevins
(74) Attorney, Agent, or Firm — Osha Bergman Watanabe & Burton LLP

(57) ABSTRACT

An optical fiber cable includes: a core; a sheath that accommodates the core therein; and a pair of tension members embedded in the sheath. The core includes: a plurality of optical fiber units that each includes a plurality of optical fibers; fibrous fillings that extend in a longitudinal direction in which the plurality of optical fiber units extends; and a wrapping tube that encloses the plurality of optical fiber units and the fibrous fillings. The core is interposed between the pair of tension members.

8 Claims, 2 Drawing Sheets

(56) References Cited

FOREIGN PATENT DOCUMENTS

| | | |
|---|---|---|
| JP | 2004-069939 A | 3/2004 |
| JP | 2004-139068 A | 5/2004 |
| JP | 2004-184546 A | 7/2004 |
| JP | 2005-010651 A | 1/2005 |
| JP | 2005-068617 A | 3/2005 |
| JP | 2007-206367 A | 8/2007 |
| JP | 2009-086637 A | 4/2009 |
| JP | 2012-009153 A | 1/2012 |
| JP | 2013-054219 A | 3/2013 |
| JP | 2014-216176 A | 11/2014 |
| JP | 2015-215447 A | 12/2015 |
| JP | 2017-029056 A | 11/2017 |

OTHER PUBLICATIONS

Notice of Allowance issued in corresponding Japanese application No. JP2017-029056 dated Nov. 14, 2017 (3 pages).

* cited by examiner

OPTICAL FIBER CABLE

CROSS-REFERENCE TO RELATED APPLICATIONS

This is a U.S. national stage application of International Application No. PCT/JP2018/003976 filed Feb. 6, 2018, which claims priority to Japanese Patent Application No. 2017-029056 filed Feb. 20, 2017, both of which are incorporated herein by reference in their entirety.

TECHNICAL FIELD

The present invention relates to an optical fiber cable.

BACKGROUND

In the related art, an optical fiber cable as disclosed in Patent Document 1 has been known. The optical fiber cable includes a shock absorbing material disposed at the center of the cable, a plurality of optical fibers disposed around the shock absorbing material, and a sheath that accommodates the shock absorbing material and the plurality of optical fibers. Then, it is disclosed that with this configuration, the shock absorbing material absorbs an external force applied to the optical fiber cable to prevent the optical fiber from being affected by the external force.

PATENT LITERATURE

[Patent Document 1] Japanese Unexamined Patent Application, First Publication No. 2005-10651

Meanwhile, in this type of optical fiber cable, a plurality of optical fibers may be bound to form an optical fiber unit, and a plurality of the optical fiber units may be accommodated in the sheath in a twisted state. In this case, due to the rigidity of the optical fiber unit, a force (untwisting force) in a direction to release the twisted state acts on the optical fiber unit itself. When the optical fiber unit is moved in the sheath by this untwisting force, the optical fiber unit cannot be kept in a twisted state. In addition, when the plurality of optical fiber units are accommodated in the sheath in a state of being twisted in the SZ manner, the untwisting force is also increased, and the movement of the optical fiber units as described above is more likely to occur.

SUMMARY

One or more embodiments of the present invention limit a movement of an optical fiber unit in an optical fiber cable.

An optical fiber cable according to one or more embodiments of the present invention includes a core including a plurality of optical fiber units each having a plurality of optical fibers; fibrous fillings extending in a longitudinal direction in which the optical fiber units extend; and a wrapping tube enclosing the plurality of optical fiber units and the fillings; a sheath that accommodates the core therein; and a pair of tension members that are embedded in the sheath so as to interpose the core therebetween, and in a transverse cross-sectional view, when a total value of cross-sectional areas of the plurality of optical fibers is Sf, a total value of cross-sectional areas of the fillings is Sb, a cross-sectional area of an inner space of the sheath is Sc, and a cross-sectional area of the wrapping tube is Sw, and it is established that $0.16 \leq Sb/Sf \leq 0.25$ and $0.10 \leq Sb/(Sc-Sw) \leq 0.15$.

According to one or more embodiments of the present invention, the movement of an optical fiber unit in an optical fiber cable can be limited.

DETAILED DESCRIPTION

The configuration of an optical fiber cable according to one or more embodiments will be described below with reference to FIG. 1.

Figure 1:
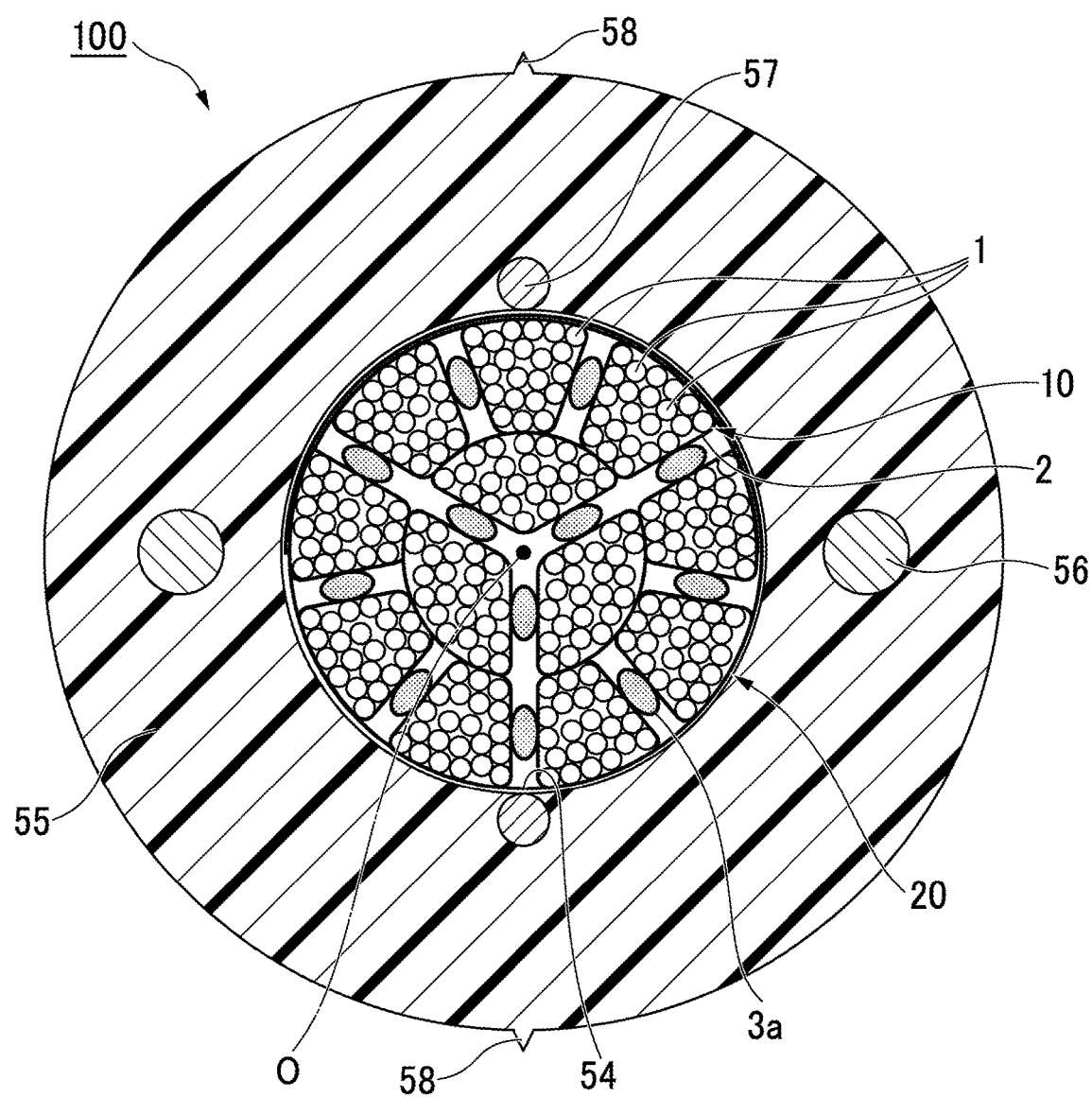
FIG. 1 is a transverse cross-sectional view of an optical fiber cable according to one or more embodiments.

In addition, in FIG. 1, scales are appropriately changed from the scales of the actual product, in order to enable recognition of the shape of each constituent member.

As shown in FIG. 1, an optical fiber cable 100 includes a core 20 having a plurality of optical fiber units 10, a sheath 55 that accommodates the core 20 therein, and a pair of tension members 56 and a pair of rip cords 57, which are embedded in the sheath 55.

Direction Definition

Here, in one or more embodiments, the optical fiber unit 10 extends along the central axis O. A direction along the central axis O is referred to as a longitudinal direction. The cross section of the optical fiber cable 100 orthogonal to the central axis O is referred to as a transverse cross section.

Further, in the transverse cross-sectional view (FIG. 1), a direction intersecting the central axis O is referred to as a radial direction, and a direction revolving around the central axis O is referred to as a circumferential direction.

The sheath 55 is formed into a cylindrical shape along the central axis O as a center. As the material of the sheath 55, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used.

As the material of the rip cord 57, a cylindrical rod made of PP, nylon, or the like can be used. Further, the rip cord 57 may be formed of yarns in which fibers such as PP or polyester are twisted. In this case, the rip cord 57 may have water absorbency.

The pair of rip cords 57 is disposed with the core 20 interposed therebetween in the radial direction. The number of rip cords 57 embedded in the sheath 55 may be one or three or more.

As the material of the tension member 56, for example, a metal wire (such as steel wire), a tension fiber (such as aramid fiber), FRP or the like can be used.

A pair of tension members 56 are disposed with the core 20 interposed therebetween in the radial direction. Further, the pair of tension members 56 are disposed at equal intervals in the radial direction from the core 20. The number of tension members 56 embedded in the sheath 55 may be one or three or more.

On the outer peripheral surface of the sheath 55, a pair of projections 58 extending along the longitudinal direction is formed.

The projections 58 and the rip cords 57 are disposed at the same position in the circumferential direction. The projections 58 serve as marks when the sheath 55 is cut to take out the rip cords 57.

The core 20 includes the plurality of optical fiber units 10, fibrous fillings 3a, and a wrapping tube 54 enclosing the plurality of optical fiber units 10 and the fillings 3a. Each optical fiber unit 10 has a plurality of optical fiber cores or optical fiber strands (hereinafter simply referred to as the optical fibers 1). The optical fiber units 10 are configured by binding a plurality of optical fibers 1 with binding materials 2. The fibrous fillings 3a extend along the longitudinal direction.

As shown in FIG. 1, the plurality of optical fiber units 10 are divided into two layers of a radially inner layer and a radially outer layer. In the transverse cross-sectional view, the optical fiber units 10 located inward in the radial direction are sector-shaped, and the optical fiber units 10 located outward in the radial direction are formed in square. In addition, the present invention is not limited to the illustrated example, the optical fiber unit 10 whose cross section is circular, oval, or polygonal may be used.

In addition, the binding material 2 is formed in thin and elongated string shape with resin or the like which has flexibility. Therefore, even in the state where the optical fibers 1 are bound with the binding material 2, the optical fibers 1 are appropriately moved to an open space in the sheath 55 while deforming the binding material 2. Therefore, the cross-sectional shape of the optical fiber unit 10 in an actual product may not be arranged as shown in FIG. 1.

Moreover, the cross-sectional shape of the fillings 3a is not limited to the illustrated oval shape. The fillings 3a move appropriately to the open space between the plurality of optical fiber units 10 while changing the cross-sectional shape. Therefore, the cross-sectional shape of the fillings 3a is not uniform as shown in FIG. 1, and for example, the fillings 3a in proximity may be integrated.

The wrapping tube 54 may be made of a material having water absorbency, such as a water absorbing tape, for example.

The optical fiber unit 10 is a so-called intermittently-adhered optical fiber ribbon. The intermittently-adhered optical fiber ribbon has a plurality of optical fibers 1. The optical fibers 1 in the intermittently-adhered optical fiber ribbon are adhered to each other, so that when the plurality of optical fibers 1 are pulled in a direction orthogonal to the longitudinal direction, the optical fibers 1 spread in a mesh shape (in a spider web shape). Specifically, a certain optical fiber 1 is adhered to an optical fiber 1 adjacent thereto on one side and another optical fiber 1 adjacent thereto on the other side, at different positions in the longitudinal direction. Further, adjacent optical fibers 1 are adhered to each other at constant intervals in the longitudinal direction.

The mode of the optical fiber unit 10 is not limited to the intermittently-adhered optical fiber ribbon, and may be changed as appropriate. For example, the optical fiber unit 10 may be obtained by simply binding the plurality of optical fibers 1 with the binding material 2.

The fillings 3a are formed of a fibrous material such as polyester fibers, aramid fibers, glass fibers, and the like. The plurality of optical fiber units 10 and the fillings 3a are twisted together in the SZ manner. The plurality of optical fiber units 10 and the fillings 3a are wrapped by the wrapping tube 54. Without being limited to the SZ manner, for example, the optical fiber unit 10 and the fillings 3a may be twisted in a spiral manner.

Further, the fillings 3a may be yarns having water absorbency or the like. In this case, the waterproof performance inside the optical fiber cable 100 can be enhanced.

As shown in FIG. 1, in the transverse cross-sectional view, the filling 3a is sandwiched between the two optical fiber units 10 in the circumferential direction. Thus, the fillings 3a are in contact with the plurality of optical fiber units 10. Further, the binding material 2 has a thin and elongated string shape. And the binding materials 2 are wound around bundles of the optical fibers 1 in a spiral shape, for example. Therefore, a portion of the optical fiber 1 which is not covered by the string-like binding material 2 is partially in contact with the filling 3a.

The optical fiber 1 usually has a structure in which a coating material such as a resin is coated around an optical fiber bare wire formed of glass. Therefore, the surface of the optical fiber 1 is smooth, and the friction coefficient when the optical fibers 1 are in contact with each other is relatively small. On the other hand, the fillings 3a are formed of a fibrous material, and their surface is less smooth than the optical fiber 1. Therefore, the friction coefficient when the fillings 3a are in contact with the optical fibers 1 is higher than the friction coefficient when the optical fibers 1 are in contact with each other.

From the above, it is possible to increase the frictional resistance when the optical fiber units 10 move relative to each other, by disposing the fillings 3a so as to be sandwiched between the plurality of optical fiber units 10. This makes it possible to limit the movement of the optical fiber unit 10 in the optical fiber cable 100. Further, since the fillings 3a are disposed so as to be sandwiched between the optical fiber units 10, when the external force acts on the optical fiber cable 100, the fillings 3a function as a shock absorbing material, thereby limiting the action of the local side pressure on the optical fiber 1.

Meanwhile, for example, vibration may be applied to the optical fiber cable 100, or the optical fiber cable 100 may be exposed temperature change. At this time, it is required for the optical fiber cable 100 that the optical fiber unit 10 does not easily move within the sheath 55 and that the transmission loss of the optical fiber 1 does not easily increase. In particular, it is required that the movement amount of the optical fiber unit 10 is within a predetermined range even if an untwisting force is applied by the optical fiber unit 10 and the fillings 3a being twisted in the SZ manner or in a spiral manner. In one or more embodiments of the present invention, an excellent optical fiber cable 100 satisfying the above requirements is obtained by adjusting the filling amount of the fillings 3a in the space within the sheath 55 and the filling amount of the fillings 3a with respect to the filling amount of the optical fiber 1. Hereinafter, specific examples will be shown and described in detail.

EXAMPLE

In the examples shown below, the optical fiber units 10 are obtained by binding the intermittently-adhered optical fiber ribbon with the binding materials 2. The plurality of optical fiber units 10 are wound together (co-winding) with yarns having water absorbency as fillings 3a. The optical fiber units 10 and the fillings 3a which are in a state of being twisted in the SZ manner are wrapped with a wrapping tube 54 to form the core 20. Then, the core 20 is accommodated in the sheath 55, whereby an optical fiber cable 100 as shown in FIG. 1 is produced. The elastic modulus of the yarns as the fillings 3a is 1000 N/mm$^2$.

In the present example, a plurality of optical fiber units 10 in which the amount of fillings 3a included in the core 20 and the number of optical fibers 1 are changed are created. Specifically, in a transverse cross-sectional view of the optical fiber cable 100 (see FIG. 1), the total value of the cross-sectional areas of the plurality of optical fibers 1 is Sf, the total value of the cross-sectional areas of the plurality of fillings 3a is Sb, the cross-sectional area of the inner space of the sheath 55 is Sc, and the cross-sectional area of the wrapping tube 54 is Sw. Then, the number of optical fibers 1 and the amount of fillings 3a contained in the optical fiber cable 100 are changed such that the numerical values of Sb/Sf and Sb/(Sc−Sw) change. Hereinafter, the numerical value of Sb/Sf is referred to as "fiber filling factor $\rho$", and the numerical value of Sb/(Sc−Sw) is referred to as the "space filling factor d".

Here, the fiber filling factor $\rho$ indicates the filling factor of the fillings 3a in the core 20 in comparison with the optical fiber 1. Further, the space filling factor d indicates the filling factor of the fillings 3a with respect to the inner space of the sheath 55 excluding the wrapping tube 54.

In the present example, the optical fiber cable 100 in which the fiber filling factor $\rho$ is changed in the range of 0.12 to 0.30 and the space filling factor d is changed in the range of 0.08 to 0.17 (conditions 1 to 7) are created. The results of conducting the core movement test and the temperature characteristic test on the optical fiber cables 100 under conditions 1 to 7 are shown in Table 1 below.

TABLE 1

| | Condition | | | | | | |
|---|---|---|---|---|---|---|---|
| | 1 | 2 | 3 | 4 | 5 | 6 | 7 |
| $\rho$ | 0.12 | 0.16 | 0.16 | 0.17 | 0.21 | 0.25 | 0.30 |
| d | 0.08 | 0.10 | 0.12 | 0.13 | 0.14 | 0.15 | 0.17 |
| Core movement | NG | OK | OK | OK | OK | OK | OK |
| Temperature characteristics | OK | OK | OK | OK | OK | OK | NG |

(Core Movement Test)

In the field of "core movement" in Table 1, the results of the core movement test performed on the optical fiber cables 100 under conditions 1 to 7 are shown. Specifically, each optical fiber cable 100 of 30 meters in length is laid and is vibrated 10000 times at a frequency of 1.3 Hz and an amplitude of 430 mm. In a case where the movement distance of the optical fiber unit 10 in the sheath 55 exceeds 20 mm, the evaluation result is determined to be insufficient (NG) (defect), and in a case where the movement distance of the optical fiber unit 10 is within 20 mm, the evaluation result is determined to be OK (good).

As shown in Table 1, with respect to the condition 1 in which the fiber filling factor $\rho$ is 0.12 and the space filling factor d is 0.08, the result of the core movement test is NG (defect). It is considered that this is because the filling amount of the fillings 3a to the optical fiber 1 and the filling amount of the fillings to the space in the sheath 55 are significantly small, so the action of limiting the movement of the optical fiber unit 10 by the fillings 3a becomes insufficient. Further, in a case where the filling amount of the filling 3a is insufficient as described above, for example, when an external force is applied to the optical fiber cable 100, the buffer action by the fillings 3a also becomes insufficient, and local side pressure may act on the optical fiber 1, which may lead to an increase in transmission loss.

On the other hand, with respect to conditions 2 to 7 in which the fiber filling factor $\rho$ is in the range of 0.16 to 0.30 and the space filling factor d is in the range of 0.10 to 0.17, the results of the core movement test are OK (good). This indicates that the above ranges of the fiber filling factor $\rho$ and the space filling factor d may be the ranges in which the movement of the optical fiber unit 10 can be limited by the fillings 3a.

(Temperature Characteristic Test)

The field of "temperature characteristics" in Table 1 shows the results of temperature characteristics tests performed for each of the optical fiber cables 100. Specifically, the temperature of the optical fiber cable 100 under conditions 1 to 7 is changed by two cycles in the range of −40° C. to +70° C., according to the "Temperature cycling" specification in "Telcordia Technologies Generic Requirements GR-20-CORE". At this time, in a case where the maximum loss fluctuation amount exceeds 0.15 dB/km, the evaluation result is determined to be insufficient (NG) (defect), and in a case where the maximum loss fluctuation amount is within 0.15 dB/km, the evaluation result is determined to be OK (good).

As shown in Table 1, with respect to the optical fiber cable 100 under the conditions 1 to 6 in which the fiber filling factor $\rho$ is in the range of 0.12 to 0.25 and the space filling factor d is in the range of 0.08 to 0.15, the results of the temperature characteristic test are OK (good). As a result of filling the optical fiber cable 100 with an appropriate amount of fillings 3a, it becomes possible for the optical fiber 1 to move to some extent. Thus, even if the components of the optical fiber cable 100 repeat thermal expansion or thermal contraction, the meandering of the optical fiber 1 and the action of the local side pressure on the optical fiber 1 can be limited.

On the other hand, with respect to the condition 7 in which the fiber filling factor $\rho$ is 0.30 and the space filling factor d is 0.17, the result of the temperature characteristic test is NG (defect). This is because the movement of the optical fiber 1 is excessively limited as a result of excessively filling the optical fiber cable 100 with the fillings 3a. Thus, when the components of the optical fiber cable 100 repeat thermal expansion and thermal contraction, a transmission loss increases due to the meandering of the optical fiber 1 or the action of the local side pressure on the optical fiber 1.

If the optical fiber cable 100 is excessively filled with the fillings 3a, it is considered that the side pressure exerted by the fillings 3a on the optical fiber 1 increases the transmission loss of the optical fiber 1.

From the above, even if the optical fiber cable 100 vibrates or the temperature changes, it is possible to limit the movement of the optical fiber unit 10 and to limit the increase in the transmission loss of the optical fiber 1, by setting the fiber filling factor $\rho$ within the range of 0.16 to 0.25 and the space filling factor d within the range of 0.10 to 0.15.

(Elastic Modulus of Filling)

Next, the result examined about the range of the elastic modulus of the filling 3a will be described.

In the present example, the temperature characteristic test is performed, by changing the elastic modulus of the fillings 3a in the range of 300 to 3000 N/mm² under the condition 4 described above. The results of this test are shown in Table 2.

TABLE 2

| | [N/mm²] | | | | | | |
|---|---|---|---|---|---|---|---|
| | Elastic modulus | | | | | | |
| | 300 | 500 | 1000 | 1500 | 2000 | 2500 | 3000 |
| Temperature characteristics | NG | OK | OK | OK | OK | NG | NG |

As shown in Table 2, in a case where the elastic modulus of the filling 3a is 300 N/mm², the result of the temperature characteristic test is NG (defect). This is because when the fillings 3a are too soft, a sufficient buffer action cannot be obtained, and the transmission loss of the optical fiber 1 increases. Further, even in a case where the elastic modulus of the filling 3a is 2500 N/mm² or more, the result of the temperature characteristic test is NG (defect). When the fillings 3a are too hard, the fillings 3a exert a side pressure on the optical fiber 1, so the transmission loss of the optical fiber 1 increases.

On the other hand, when the elastic modulus of the fillings 3a is in the range of 500 to 2000 N/mm², the result of the temperature characteristic test is OK (good). This is because the fillings 3a have an elastic modulus that can exhibit a sufficient buffer function. Thus, when the components of the optical fiber cable 100 repeat thermal expansion and thermal contraction, it is possible to limit the meandering of the optical fiber 1 or the action of the local side pressure on the optical fiber 1. Therefore, the elastic modulus of the fillings 3a may be 500 N/mm² or more and 2000 N/mm² or less.

(Thermal Contraction Rate of Filling)

In the manufacturing process of the optical fiber cable 100, the core 20 may be covered with the sheath 55 by extruding the heated material as the sheath 55 outward in the radial direction of the core 20. In this case, the components in the core 20 are also heated and then cooled. At this time, in a case where the thermal contraction rate of the fillings 3a is too high, when the fillings 3a that have become high temperature are cooled thereafter and thermally shrunk greatly, the fillings 3a winds the adjacent optical fiber 1, so the optical fiber 1 may meander.

In a case where the thermal contraction rate of the fillings 3a is too high, when the temperature becomes room temperature, the length of the fillings 3a becomes shorter than the optical fiber 1. More specifically, the excess length rate of the fillings 3a becomes less than the excess length rate of the optical fiber 1. In this case, when the optical fiber unit 10 is twisted, the fillings 3a may press the optical fiber 1.

In order to prevent such a phenomenon, the thermal contraction rate of the fillings 3a may be 5% or less.

As described above, since the filling amount of the filling 3a is adjusted so as to satisfy 0.16≤Sb/Sf and 0.10≤Sb/(Sc−Sw), even in the case where the optical fiber cable 100 vibrates, the movement of the optical fiber unit 10 can be limited by the fillings 3a. By adjusting the filling amount of the filling 3a so as to satisfy Sb/Sf≤0.25 and Sb/(Sc−Sw) ≤0.15, it is possible to limit an increase in transmission loss due to the side pressure acting on the optical fiber 1 caused by excessively filling the sheath 55 with fillings 3a.

Further, by setting the filling amount of the filling 3a in the above-described range, even if the components of the optical fiber cable 100 thermally expand or shrink due to temperature change, the meandering of the optical fiber 1 and the action of the side pressure on the optical fiber 1 can be limited.

Further, by setting the elastic modulus of the filling 3a to 2000 N/mm² or less, an increase in the side pressure acting on the optical fiber 1 due to the filling 3a being too hard can be limited. Further, by setting the elastic modulus of the fillings 3a to 500 N/mm² or more, it is possible to prevent the buffer action of the fillings 3a from being insufficient because the fillings 3a are too soft.

Further, in a case where the thermal contraction rate of the fillings 3a is too high, for example, when the fillings 3a have become high temperature during the manufacture of the optical fiber cable 100 and are cooled thereafter, the fillings 3a thermally shrunk greatly. In this case, the fillings 3a winds the adjacent optical fiber 1, so the optical fiber 1 may meander. By setting the thermal contraction rate of the fillings 3a to 5% or less, the thermal contraction amount of the fillings 3a can be reduced. Thus, it is possible to limit the meandering of the optical fiber 1 or the pressing of the fillings 3a on optical fiber 1. This is because the fillings 3a are not greatly thermally shrunk during the manufacturing of the optical fiber cable 100. Further, it is possible to limit an increase in transmission loss due to the optical fiber 1 meandering or the action of the side pressure on the optical fiber 1.

Moreover, in the transverse cross-sectional view, the fibrous fillings 3a are sandwiched between the plurality of optical fiber units 10, so for example, as compared with the case where the optical fiber units 10 are in contact with each other without sandwiching the fillings 3a, it is possible to increase the frictional resistance when the optical fiber units 10 move relative to each other. Thereby, movement of the optical fiber unit 10 in the sheath 55 can be more reliably limited.

Further, since the fillings 3a are disposed between the optical fiber units 10, the fillings 3a can function more reliably as a shock absorbing material. Thus, for example, in a case where an external force is applied to the optical fiber cable 100, local side pressure acting on the optical fiber 1 due to the optical fiber units 10 being pressed against each other can be limited.

It should be noted that the technical scope of the present invention is not limited to the above-described embodiments, and various modifications can be made without departing from the spirit of the present invention.

For example, the arrangement of the optical fiber units 10 and the fillings 3a in the sheath 55 is not limited to the illustrated example, and may be changed as appropriate. For example, the plurality of fillings 3a may be disposed at the center (center in the radial direction) of the optical fiber cable 100. In this case, when an external force is applied to the optical fiber cable 100, the external force can be more reliably absorbed. Further, in a case where the fillings 3a have water absorbency, it is possible to enhance the waterproof performance in the center of the optical fiber cable 100.

Figure 2:
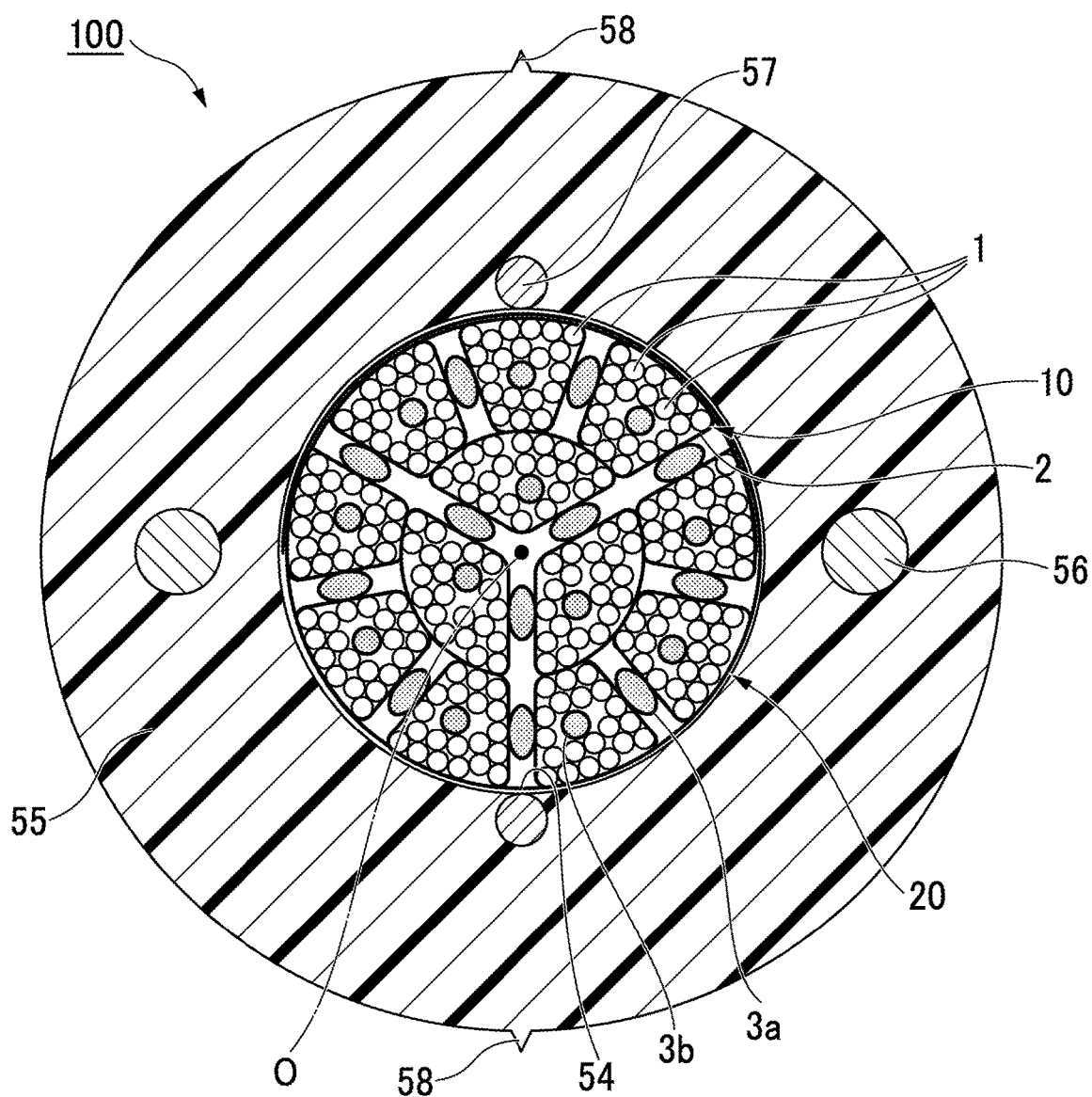
FIG. 2 is a transverse cross-sectional view of an optical fiber cable according to a modification example, in accordance with one or more embodiments.

In addition, the optical fiber cable 100 may include the fillings 3b disposed in the optical fiber units 10, as shown in FIG. 2, for example. Such optical fiber units 10 can be formed by binding the fillings 3b and the optical fibers 1 with the binding materials 2. The fillings 3b may be located at the center of the optical fiber unit 10 in a transverse cross-sectional view.

In this case, for example, when an external force that compresses is applied to the optical fiber unit 10, the external force can be absorbed by the fillings 3b disposed in the optical fiber unit 10. In addition, the fillings 3b may not be located at the center of the optical fiber unit 10.

The filling 3b disposed in the optical fiber unit 10 may be made of the same material as the filling 3a located between the optical fiber units 10, or may be made of a different material. Further, in a case where the fillings 3b are disposed in the optical fiber unit 10, Sb is defined by the sum of the cross-sectional area of the filling 3a and the cross-sectional area of the filling 3b. Even in the optical fiber cable 100 of FIG. 2, the same effects as those discussed with reference to FIG. 1 can be obtained by setting the fiber filling factor ρ including the value of Sb and the space filling factor d within the ranges shown in the above-discussed embodiments.

Further, at least a part of the plurality of optical fiber units 10 included in the optical fiber cable 100 may have the fillings 3b and the binding material 2.

Further, the optical fiber cable 100 may have the fillings 3b located in the optical fiber unit 10, without the fillings 3a located between the optical fiber units 10.

According to the optical fiber cable 100 of one or more embodiments, the optical fiber unit 10 includes the binding material 2 that binds the fillings 3b and the plurality of optical fibers 1.

With this configuration, for example, when the plurality of optical fiber units 10 are wrapped by the wrapping tube 54, the fillings 3b are bound together with the optical fibers 1 by the binding materials 2, so the fillings 3b are prevented from being entangled with other optical fiber units 10 or a manufacturing apparatus, which makes it possible to more stably manufacture the optical fiber cable 100.

Further, since the fillings 3b are positioned within the respective optical fiber units 10, the fillings 3b are prevented from being biasedly disposed in the sheath 55, and the waterproof effect in the sheath 55 by the fillings 3b can be more successfully exerted. Thus, it is possible to reduce the cost, by reducing the number of fillings 3b to be accommodated in the sheath 55, or by using a material having a low water absorbency grade as the fillings 3b.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 optical fiber
2 binding material
3a, 3b filling
10 optical fiber unit
20 core
54 wrapping tube
55 sheath
56 tension member
57 rip cord
100 optical fiber cable

What is claimed is:

1. An optical fiber cable comprising:
a core comprising:
   a plurality of optical fiber units each comprising a plurality of optical fibers;
   fibrous fillings that extend in a longitudinal direction in which the plurality of optical fiber units extends; and
   a wrapping tube that encloses the plurality of optical fiber units and the fibrous fillings;
a sheath that accommodates the core therein; and
a pair of tension members embedded in the sheath, wherein
the core is interposed between the pair of tension members, and
the following equations are held:

$$0.16 \leq Sb/Sf \leq 0.25 \text{ and } 0.10 \leq Sb/(Sc-Sw) \leq 0.15,$$

where in a transverse cross-sectional view of the optical fiber cable: Sf is a total value of cross-sectional areas of the plurality of optical fibers, Sb is a total value of cross-sectional areas of the fibrous fillings, Sc is a cross-sectional area of an inner space of the sheath, and Sw is a cross-sectional area of the wrapping tube.

2. The optical fiber cable according to claim 1, wherein an elastic modulus of the fibrous fillings is 500 N/mm$^2$ or more and 2000 N/mm$^2$ or less.

3. The optical fiber cable according to claim 1, wherein a thermal contraction rate of the fibrous fillings is 5% or less.

4. The optical fiber cable according to claim 1, wherein the fibrous fillings are sandwiched between the plurality of optical fiber units in the transverse cross-sectional view of the optical fiber cable.

5. The optical fiber cable according to claim 1, wherein at least some of the plurality of optical fiber units comprise a binding material that binds the fibrous fillings and the plurality of optical fibers.

6. The optical fiber cable according to claim 1, wherein the plurality of optical fiber units and the fibrous fillings are twisted together.

7. The optical fiber cable according to claim 1, wherein the fibrous fillings are sandwiched between adjacent two optical fiber units of the plurality of optical fiber units in a circumferential direction.

8. The optical fiber cable according to claim 1, wherein the wrapping tube is different from the sheath.

* * * * *